United States Patent
Ahtikari

(10) Patent No.: US 12,194,882 B2
(45) Date of Patent: Jan. 14, 2025

(54) SCALABLE METHOD TO HANDLE FAULTS IN A NETWORK OF ELECTRIC VEHICLE CHARGING STATIONS

(71) Applicant: LIIKENNEVIRTA OY / VIRTA LTD, Helsinki (FI)

(72) Inventor: Jussi Ahtikari, Helsinki (FI)

(73) Assignee: LIIKENNEVIRTA OY / VIRTA LTD, Helsinki (FI)

( * ) Notice: Subject to any disclaimer, the term of this patent is extended or adjusted under 35 U.S.C. 154(b) by 0 days.

(21) Appl. No.: 18/702,501

(22) PCT Filed: Apr. 6, 2023

(86) PCT No.: PCT/FI2023/050192
§ 371 (c)(1),
(2) Date: Apr. 18, 2024

(87) PCT Pub. No.: WO2023/203278
PCT Pub. Date: Oct. 26, 2023

(65) Prior Publication Data
US 2024/0326639 A1   Oct. 3, 2024

(30) Foreign Application Priority Data
Apr. 22, 2022   (FI) .................................... 20225337

(51) Int. Cl.
*H02J 7/00*    (2006.01)
*B60L 53/67*   (2019.01)
*B60L 53/68*   (2019.01)
*H02J 7/14*    (2006.01)

(52) U.S. Cl.
CPC ............... *B60L 53/68* (2019.02); *B60L 53/67* (2019.02)

(58) Field of Classification Search
CPC .......... B60L 53/67; B60L 53/68; B60L 53/66; B60L 53/64; B60L 53/57; B60L 53/50; B60L 53/30; B60L 53/14; B60L 53/10
USPC ......................................................... 320/109
See application file for complete search history.

(56) References Cited

U.S. PATENT DOCUMENTS

| | | | |
|---|---|---|---|
| 10,618,427 B1 * | 4/2020 | McNamara | B60L 53/53 |
| 11,400,823 B1 * | 8/2022 | Sampath | B60L 58/12 |
| 2011/0276194 A1 * | 11/2011 | Emalfarb | B60L 53/66 |
| | | | 700/297 |

(Continued)

FOREIGN PATENT DOCUMENTS

| | | |
|---|---|---|
| CN | 107133675 A | 9/2017 |
| CN | 108804255 A | 11/2018 |

(Continued)

OTHER PUBLICATIONS

Finnish Search Report for Finnish Patent Application No. 20225337, mailed Nov. 9, 2022, (1 page).

(Continued)

*Primary Examiner* — Alexis B Pacheco
(74) *Attorney, Agent, or Firm* — ALSTON & BIRD LLP

(57) ABSTRACT

Example embodiments enable a scalable method (200) to manage faults of a wide network of electric vehicle charging stations comprising even thousands electric vehicle charging stations. The occurred faults may be solved automatically when possible. The faults may be prioritized based on one or more criterion. The method (200) and an apparatus (600) is provided to handle the faults more efficiently.

11 Claims, 4 Drawing Sheets

(56) References Cited

U.S. PATENT DOCUMENTS

| | | | |
|---|---|---|---|
| 2013/0046457 A1* | 2/2013 | Pettersson | B60L 58/12 |
| | | | 701/1 |
| 2015/0095789 A1* | 4/2015 | Hyde | G06Q 10/0631 |
| | | | 715/738 |
| 2015/0278038 A1 | 10/2015 | Halker et al. | |
| 2018/0141450 A1* | 5/2018 | Oh | B60L 53/35 |
| 2018/0358839 A1* | 12/2018 | Perez | H02J 3/46 |
| 2019/0160957 A1* | 5/2019 | Hooker | G07C 9/20 |
| 2019/0160972 A1* | 5/2019 | Zeiler | H01M 10/425 |
| 2019/0379212 A1* | 12/2019 | Cho | G06N 3/088 |
| 2020/0001735 A1* | 1/2020 | Cheng | B64U 80/70 |
| 2020/0009990 A1* | 1/2020 | Shiiyama | B60L 53/30 |
| 2020/0274388 A1* | 8/2020 | McNamara | B60L 53/52 |

FOREIGN PATENT DOCUMENTS

| | | |
|---|---|---|
| CN | 110569997 A | 12/2019 |
| CN | 110646699 A | 1/2020 |
| CN | 111275315 A | 6/2020 |
| CN | 112434826 A | 3/2021 |
| CN | 112927461 A | 6/2021 |
| CN | 113592108 A | 11/2021 |
| KR | 10-2019-0056553 A | 5/2019 |
| WO | WO 2021/068947 A1 | 4/2021 |
| WO | WO 2021/089914 A1 | 5/2021 |

OTHER PUBLICATIONS

International Preliminary Report on Patentability (IPRP) for International Patent Application No. PCT/FI2023/050192, mailed Nov. 23, 2023, (15 pages).

International Search Report (ISR) for International Patent Application No. PCT/FI2023/050192, mailed Jul. 10, 2023, (4 pages).

Office Action of Finnish Patent Application No. 20225337, mailed Mar. 1, 2024, (9 pages).

Office Action of Chinese Patent Application No. 202380014638.8, mailed Oct. 10, 2024, (13 pages).

* cited by examiner

| Fault Priority Points | Actions 1 – No action | 2-Automatic actions | 3-Alert remote maintenance | 4-Alert local maintenance |
|---|---|---|---|---|
| 80-100 | | 1,2,3 | X | X |
| 50-79 | | 1,2 | X | |
| 25-59 | | 1 | X | |
| 5-24 | | 1 | | |
| 0-4 | X | | | |

SCALABLE METHOD TO HANDLE FAULTS IN A NETWORK OF ELECTRIC VEHICLE CHARGING STATIONS

CROSS-REFERENCE TO RELATED APPLICATIONS

The present application is a national phase entry of International Application No. PCT/FI2023/050192, filed Apr. 6, 2023, which claims priority to Finnish Application No. 20225337, filed Apr. 22, 2022, which are each incorporated herein by reference in its entirety.

TECHNICAL FIELD

The present application generally relates to electric vehicle charging stations. In particular, some example embodiments of the present application relate to fault management of a network of electric vehicle charging stations.

BACKGROUND

Electric vehicle charging stations have faults for different reasons from time to time. The fault may cause the charging station to stop working, or the charging station may not work properly. Handling the faults may take a lot of resources. Hence, it would be beneficial to alleviate at least some of these drawbacks.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable more efficient and reasoned management of faults at electric vehicle charging stations. The proposed method is particularly useful for management of the faults at a network of thousands of electric vehicle charging stations, wherein hundreds of faults may occur daily, for example.

According to a first aspect, a method to manage faults of electric vehicle charging stations is provided. The method is carried out by an apparatus and the method comprises detecting a trigger for calculation of a fault priority index for at least one electric vehicle charging station; determining one or more fault indicators comprising at least one of a duration of an offline state, a frequency of the offline state, a duration of a fault, a frequency of the faults or a number of rejected commands within a predetermined interval at the electric vehicle charging station; determining the fault priority index by combining values of the one or more fault indicators; and initiating at least one action to manage fault at the at least one charging station based on the fault priority index.

In an embodiment, the trigger comprises at least one of an indication the electric vehicle charging station is offline, a fault status notification from the electric vehicle charging station, a rejection of a command by the electric vehicle charging station, a failure to answer to a command by the electric vehicle charging station or a return to a normal state by the electric vehicle charging station.

In an embodiment, in addition or alternatively, the frequency of the offline state is determined based on a total duration of the offline states of the electric vehicle charging station within the predetermined interval.

In an embodiment, in addition or alternatively, the frequency of the faults is determined based on a total duration of the faults of the electric vehicle charging station within the predetermined interval.

In an embodiment, in addition or alternatively, the at least one action comprises at least one of providing a list of the electric vehicle charging stations in an order of urgency based on the fault priority indexes, providing a recommendation how to fix the fault, rebooting the electric vehicle charging station, performing a firmware update to the electric vehicle charging station, resetting internet connectivity of the charging station, alerting a remote maintenance, or alerting an onsite maintenance.

In an embodiment, in addition or alternatively, the method further comprises determining a priority level of the fault priority index based on a plurality of priority levels having different predetermined thresholds for the fault priority index; and initiating the at least one action based on the priority level of the fault priority index.

In an embodiment, in addition or alternatively, the method further comprises updating the fault priority index of the electric vehicle charging station after performing the at least one action; and if the updated fault priority index indicates that the fault still exists, initiating another action according to the priority level of the fault priority index.

In an embodiment, in addition or alternatively, the method further comprises grouping a plurality of electric vehicle charging stations into a plurality of child groups; grouping the plurality of child groups into one or more parent groups; determining an escalation index for each group by multiplying the number of faulty electric vehicle charging stations in the group by the sum of the fault priority indexes in the group, and dividing the value by the number of electric vehicle charging stations without a fault in the group; and providing a notification to a contact person of the parent group when the escalation index exceeds a predetermined limit for the child group.

According to a second aspect, an apparatus to manage faults of electric vehicle charging stations is provided, the apparatus comprising at least one processor; and at least one memory comprising program code configured to, with the at least one processor, cause the apparatus at least to detect a trigger for calculation of a fault priority index for at least one electric vehicle charging station; determine one or more fault indicators comprising at least one of a duration of an offline state, a frequency of the offline state, a duration of the fault, a frequency of faults or a number of rejected commands within a predetermined interval at the electric vehicle charging station; determine the fault priority index by combining values of the one or more fault indicators; and initiate at least one action to manage fault at the at least one charging station based on the fault priority index.

In an embodiment, the trigger comprises at least one of an indication the electric vehicle charging station is offline, a fault status notification from the electric vehicle charging station, a rejection of a command by the electric vehicle charging station, a failure to answer to a command by the electric vehicle charging station or a return to a normal state by the electric vehicle charging station.

In an embodiment, in addition or alternatively, the at least one action comprises at least one of creating a list of the electric vehicle charging stations in an order of urgency based on the fault priority indexes, providing a recommendation how to fix the fault, rebooting the electric vehicle charging station, performing a firmware update to the electric vehicle charging station, resetting internet connectivity of the charging station, alerting a remote maintenance, or alerting an onsite maintenance.

In an embodiment, in addition or alternatively, the at least one memory further comprises program code configured to, with the at least one processor, cause the apparatus to determine a priority level of the fault priority index based on a plurality of priority levels having different predetermined thresholds for the fault priority index; and initiate the at least one action based on the priority level of the fault priority index.

In an embodiment, in addition or alternatively, the at least one memory further comprises program code configured to, with the at least one processor, cause the apparatus to update the fault priority index of the electric vehicle charging station after the at least one action; and if the updated fault priority index indicates that the fault still exists, initiate another action according to the priority level of the fault priority index.

In an embodiment, in addition or alternatively, the at least one memory further comprises program code configured to, with the at least one processor, cause the apparatus to group a plurality of electric vehicle charging stations into a plurality of child groups; group the plurality of child groups into one or more parent groups; determine an escalation index for each group by multiplying the number of faulty electric vehicle charging stations in the group by the sum of the fault priority indexes in the group, and dividing the value by the number of electric vehicle charging stations without a fault in the group; and provide a notification to a contact person of the parent group when the escalation index exceeds a predetermined limit for the child group.

According to a third aspect, there is provided a computer-readable medium comprising instructions which, when executed by a computer, cause the computer to carry out the method of the first aspect.

Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

DETAILED DESCRIPTION

Figure 1:
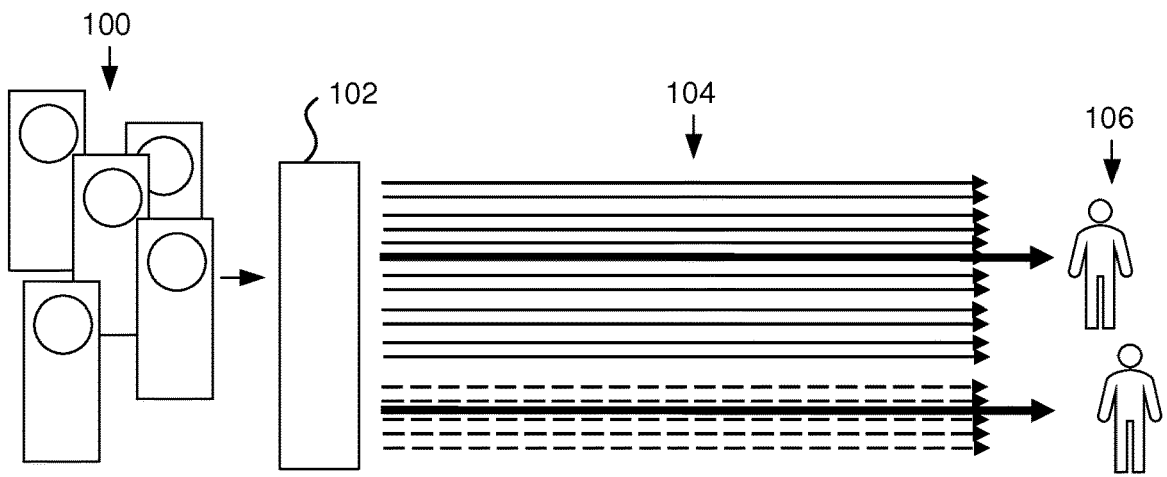
FIG. 1 illustrates an example of a fault management system of a network of electric vehicle charging stations according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

Electric vehicle charging stations are used to charge electric vehicles (EV). In this disclosure, the electric vehicle charging stations can be called charging stations. The charging stations may be connected to a Charging Station Management System (CSMS) with OCPP protocol (Open Charge Point Protocol). EV drivers own electric vehicles (EV) and charge their EVs on charging stations.

The charging stations have often different technical faults. In big charging station networks, which may comprise thousands, or even tens of thousands of charging stations, there may be at least hundreds, or sometimes even a few thousand charging stations which are broken for some reason at a time.

Handling faults manually by a central organization is fairly expensive. For example, managing and solving faults of over 1000 charging stations daily would need a big team of people, and to manage the faults globally it would result in a big and expensive arrangement to handle all the faults manually.

To manage the network, information on which charging stations have faults, what the fault is, how to correct the fault and whether the fault has been corrected or not may be needed. For example, for each fault, a ticket may be created, and support personnel may then check each ticket. However, when there are thousands of charging stations, the ticketing system may cause too much work. Ticketing may be also automated, where each charging station has a responsible maintenance person, and a ticket is automatically created for this person for each fault. However, in practice there may be too many tickets and lots of false alarms. Because of this, people may start ignoring the tickets and alerts too easily. Sometimes the maintenance personnel forget to keep the tickets updated so that it is hard to know which charging stations actually have faults and which are already fixed.

A charging station may be also rebooted automatically when the charging station sends an alert of a fault. This may solve some problems, but not all of them. Further, the charging station may be offline so it may not be rebooted remotely, or the charging station may not even send the alert which would trigger the reboot in a first place.

In general, a fault in a charging station may be detected by three standard ways. In a first method, a fault may be detected, for example, based on a broken websocket connection. When the websocket connection is broken, the charging station may have lost connection to the CSMS and is offline. In addition, a fault may be detected based on missing heartbeats, i.e., periodic signals generated by the charging station to indicate normal operation and/or for synchronization. When one or more heartbeats/signals are missed, the charging station may not be communicating anymore, even if websocket is open. In addition, a fault may be detected based on a status notification received from the charging station with a fault-status indicating there is a fault with the charging station.

However, the above detection methods have two issues. The charging stations often send a lot of status notifications, such as even thousands a day. Further, often the faults that the charging station reports are solved automatically. For that reason, it may not be reasonable to always alert maintenance personnel of each individual fault or offline period. Also, it may be common that the charging station is online and sending heartbeats, and has not sent any fault notifications, but still for some reason charging does not work on that charging station.

An objective is to provide an automated system for noticing and managing faults at electric vehicle charging stations. The method may enable tracing which faults have been solved automatically and which are not.

In an embodiment, the faults may be noticed even when the charging station has not sent fault information. In an embodiment, alerts about the faults may be created in a hierarchical manner. Hence, the faults may be prioritized such that if the fault has not been automatically solved, the faults which need attention first may be handled before less critical faults. The method may improve performance of a network of electric vehicle charging stations with the improved fault management.

FIG. 1 illustrates an example of a fault management system of a network 100 of electric vehicle charging stations according to an example embodiment. The network 100 may comprise hundreds of charging stations. In an embodiment, the network 100 may comprise at least a thousand of charging stations. In an embodiment, the network 100 may comprise hundreds of thousands of charging stations.

Each charging station may be communicatively coupled to a CSMS server 102. The CSMS server 102 may be configured to perform one or more actions based on triggers received from the network 100. The CSMS server 102 may be configured to determine a fault priority index for each of the charging stations based on a trigger received from the respective charging station.

The one or more actions may be performed based on the fault priority indexes. The fault priority indexes may be used by the CSMS server 102 to prioritize some faults over other faults. The faults may be prioritized such that instead of reporting each fault 104 to maintenance 106, only the faults which are determined to require attention from the maintenance cause creation of a notification. The notification may be created after automated actions initiated by the CSMS server 102 do not solve the fault and when the fault priority index exceed a predetermined threshold. Hence, maintenance of the network 100 may be automated and speeded up as the number of alerts requiring attention from maintenance personnel 106 may be reduced and focused based on their urgency.

Figure 2:
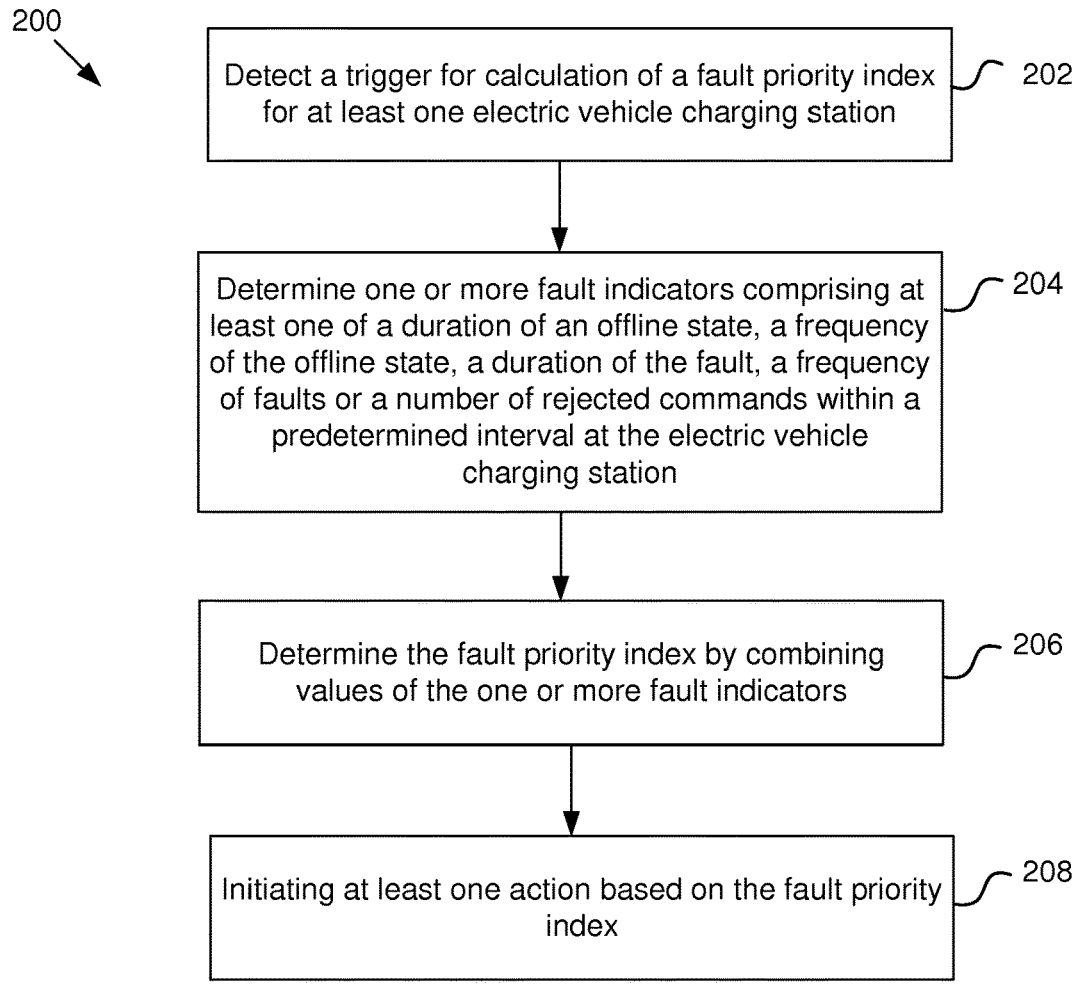
FIG. 2 illustrates an example of a flow chart of a method to manage faults of a network of electric vehicle charging stations according to an example embodiment.

FIG. 2 illustrates an example of a flow chart of a method 200 to manage faults of a network of electric vehicle charging stations according to an example embodiment.

At 202, the method may comprise detecting a trigger for calculation of a fault priority index for at least one electric vehicle charging station. In an embodiment, the trigger may be obtained from a healthy charging station indicating the charging station has gone offline or has some other kind of a fault. A healthy charging station may refer to a charging station which is online and works as it should, i.e., there are no faults. In an embodiment, the trigger may be obtained from a faulted charging station indicating that the charging station has recovered. This means, that the charging station may have returned online and it is no longer faulted, i.e., it is working as it should.

At 204, the method may comprise determining one or more fault indicators. The fault indicator may comprise at least one of a duration of an offline state, a frequency of the offline state, a duration of the fault, a frequency of faults or a number of rejected commands within a predetermined interval at the electric vehicle charging station.

The offline duration may give information on how long the respective charging station has been offline. The fault duration may give information on how long the respective charging station has been in the fault-state. The durations may be measured, for example, in minutes. In an embodiment, the triggers may be used in calculating the durations. For example, calculation of the duration may be started in response to a first trigger indicating a fault, and stopped in response to a second trigger indicating recovery.

The offline frequency may give information on for how long the charging station has been offline in total during a predetermined time period, such as during the last 7 days. The fault frequency may give information on how many faults has the charging station reported during the predetermined time period, such as the last 7 days. In an embodiment, the number of faults may be determined based on the triggers such that a first trigger received after reception of a second trigger may indicate a new fault.

The number of rejected commands may give information on how many commands (e.g., OCPP commands) sent by, for example, the CSMS to the charging station has the charging station rejected or not answered at all. The number of rejected commands may be compared to the number of accepted commands during the predetermined time period, such as the last 7 days.

At 206, the method may comprise determining the fault priority index by combining values of the one or more fault indicators. The fault priority index may be calculated for each charging station in a network. In an embodiment, the fault priority index may have values on a scale of 0-100, where 100 indicates the most urgent problem. However, the scale is only one example. In an embodiment, the calculation may be also triggered when the charging station previously indicated as being faulted or offline returns to a normal state, i.e., the charging station may have sent a notification of a normal (non-faulted) status, or it is again online.

Based on the fault priority index, it may be determined how urgent the fault is. For example, if a charging station has been offline just for five minutes, it may not yet be an urgent problem and it may be waited for a while before investigation on the problem is started. Hence, the total fault priority index may comprise a value determined based on the offline duration (time from offline until the current time). For example, if the charging station has been offline for less than ten minutes, the fault priority index for the fault indicator may be 0 points. If the charging station has been offline for more than 24 hours, the fault priority index for the fault indicator may be 20 points. The other points, from 1 to 19, may be determined linearly between the minimum (e.g., 10 minutes) and maximum (e.g., 24 hours) time periods. This is only one example, and the points and time limits are configurable.

The offline frequency may indicate if the fault is a first problem or if the charging station has had the problems before also. The more problems the charging station has had, the more urgent the fault may be. The fault priority index for the offline frequency may be calculated by summing together duration of all offline periods during the predetermined time period, and calculating an offline percentage, wherein the offline percentage=offline duration minutes/total minutes in the predetermined time period. If the offline duration is less than 1%, the fault priority index value may be 0 points, for example. If the offline duration is more than 80%, the fault priority index value may be 20 points, for example. Other points may be calculated linearly between the minimum (1%) and maximum (80%) offline durations. This is only one example, and the points and percentage limits are configurable.

The fault duration may indicate urgency of the fault. For example, if a charging station has been faulted just for five minutes, it may not yet be an urgent problem. Hence, it may wait for a while before investigation on the problem may be started. The total fault priority index may comprise a value determined based on a duration of the latest fault period (time from the faulted state to a non-faulted state). For example, if the charging station has been faulted for less than ten minutes, the fault priority index for the fault indicator may be 0 points. If the charging station has been faulted for more than 24 hours, the fault priority index for the fault indicator may be 20 points, for example. Other points between the 0 and 20 points may be determined linearly between the minimum (10 minutes) and maximum (24 hours) time periods. This is only one example, and the points and time limits are configurable.

The fault frequency may indicate if the fault is a first problem or if the charging station has had the problems before also. The more problems the charging station has had, the more urgent the fault may be. The fault priority index for the fault frequency may be calculated by summing together duration of all fault periods during the predetermined time period, and calculating a fault percentage, wherein the offline percentage=fault duration minutes/total minutes in the predetermined time period. If the fault duration has been less than 1%, the fault priority index value may be 0 points, for example. If the fault duration has been more than 80%, the fault priority index value may be points, for example. Other points may be calculated linearly between the minimum (1%) and maximum (80%) fault durations. This is only one example, and the points and percentage limits are configurable.

Even if the charging station is online and has not sent any fault notifications, it may still be faulted. For example, if the charging station does not answer to some messages, it may be determined that the charging station is not working as it should. For example, the charging station may not answer to key OCPP messages, such as 'authorize charging', 'start charging' and 'stop charging'. The fault priority index value may be calculated for the number of rejected commands by summing together all non-answered and rejected messages for the predetermine time period. In an embodiment, the fault priority index value may be determined based on the number of non-answered and/or rejected messages of specific key message types. If the total count is more than 50 messages, the fault priority index value may be points, for example. If the total number of messages is less than 5, the fault priority index value may be 0 points, for example. Other points from 1 to 19 may be calculated linearly for message counts between the 5 and 50 messages, for example. This is only one example, and the points and limits for messages are configurable.

At 208, the method may comprise initiating at least one action based on the fault priority index. The at least one action may comprise sending one or more commands configured to reboot or change one or more settings at the charging station, for example. At least some of the commands may be send automatically. If such remote actions do not solve the issue, the next action may be sending a message to a maintenance person for further investigation.

Different alerts may be treated in different ways. The alert may refer to a created or updated fault priority index. One option is to do nothing (e.g., to wait and see how the situation develops). This may be the case, for example, for low priority alerts. The low priority alert may refer to an updated fault priority index which is below a certain threshold. The low priority alerts may be caused by some random errors which go away by themselves, and no interaction may be needed.

Another option is to use some automated actions. In many cases, rebooting the charging station helps to correct the fault. In addition to the reboot, for example doing a firmware update to a latest firmware version may help to overcome the problem. Further, the automated action may comprise sending a 'cancel location'-message to a sim-card of the charging station to reset internet connectivity of the charging station.

After the one or more automatic actions are performed, the method may comprise determining if manual actions are required. If yes, then the method may comprise creating a ticket to a remote maintenance personnel or to onsite maintenance personnel in a hierarchical manner.

For example, rebooting may be tried first, and if that does not solve the fault, the method may comprise next trying remote firmware update. If that does not help, the method may comprise trying to reset the internet connectivity. One further option is to alert remote maintenance. Some faults may be caused, for example, by invalid configurations, old firmware versions, etc., which may be solved remotely by the maintenance personnel. One further option is to alert onsite maintenance. For example, when something is physically broken it may be needed to alert a maintenance person to replace one or more components of the charging station or do other maintenance tasks onsite.

The fault priority index may be updated each time a new trigger is detected. The method may comprise providing an updated report of charging stations in the network. The report may comprise the charging stations on fault priority order based on the fault priority indexes such that the charging station with highest fault priority index is first. Hence, the report indicates the most urgent faults. This may help the maintenance personnel to select which alerts they should react to. The report may further comprise information on which company owns the charging stations and who is the maintenance contact.

The report may comprise detailed information about the charging stations, such as their owner and contact person. A user may select any of the reported charging stations to view more details on individual faults. The detailed fault report may comprise, for example, basic information of the charging station such as name of the charging station, a location, a company, the contact information, POI (point-of-interest) information, etc. The report may show in detail from which things (fault indicators) the fault priority index comes from, how serious the problem is, and possible actions needed to fix the issues.

An example embodiment may enable to avoid manual work as much as possible with the automated actions. Further, when manual work is needed, the work may be distributed widely such that it may be done as closely as possible to the place where the occurred faults may be manually fixed. For example, a global platform company may have operations in tens of different countries. When a high priority alert is received from one country, the platform company's centralized personnel may not be able to solve it. Therefore, it may be determined based on the report from which country the fault information is received from, to which company the faulted charging station is associated to, to which location of that company, and, if possible, alert directly the maintenance person of the location to check what is wrong with the charging station. The high priority alert may refer to an updated fault priority index which is above a certain threshold.

For example, the report may show issues of a selected charging station within a selected time interval, such as 1.1.2022-7.1.2022. The report may show that the charging station has had three faults within that time, for example. A first issue may be that the charging station was offline, which may be marked as a high priority fault. The report may show details about the event, such as that the charging station has been offline 73% during the last seven days. In addition, the report may show recommended actions based on the fault type and its priority. A second issue may be a medium priority fault, and the details may show that the charging station has had poor GSM signal for 15 times within the selected time. Again, the report may show recommended actions based on the fault and their priority. A third issue may be a low priority fault. The details may show that the charging station has reported a connector lock failure for two times within the selected time interval. The low priority fault may have no recommended actions, if it currently requires no actions based on the fault type and priority.

When a charging station has some fault, it may become worse and worse over time. On the other hand, some maintenance action, like a firmware update, may improve the situation. Therefore, it may be beneficial to follow fault trends instead of only the current situation. Each trigger may be associated with a timestamp. The fault trends may enable to track an overall status and direction of the whole network. The fault trend of the network may be determined by summing up all the fault priority index values from all of the charging stations in the network on a given time period based on the timestamps. Each trigger may be associated with a timestamp. Alternatively, or in addition, the fault trend of an individual charging stations may be tracked by summing up the fault priority index values of the individual charging station on the given time period. In an embodiment, the method may comprise providing such fault trends to be displayed to a user.

In an embodiment, the automated actions may be performed hierarchically. The method may comprise determining a plurality of priority levels based on the fault priority index values and respective actions for the different priority levels. The actions dedicated for the respective priority level may be also in hierarchical order such that if a first action does not solve the problem (decrease the fault priority index), the next action may be performed, and so on.

Figure 3:
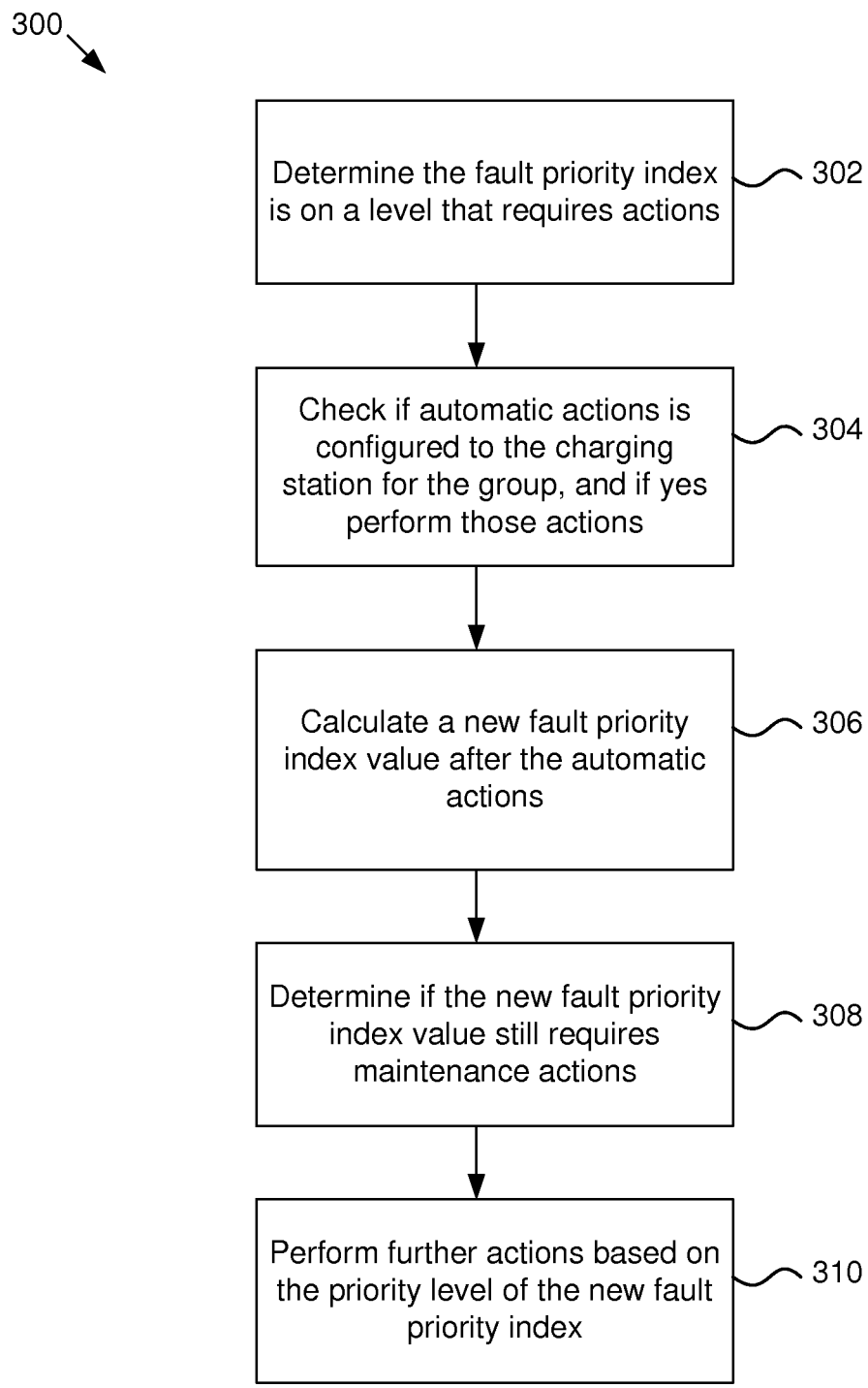
FIG. 3 illustrates an example of flow chart of a process to create maintenance alerts according to an example embodiment.

FIG. 3 illustrates an example of flow chart of a process 300 to create maintenance alerts according to an example embodiment.

At 302, the method may comprise determining a current fault priority index of the charging station. Based on the current fault priority index, the method may comprise determining a priority level of the charging station. The method may comprise configuring a plurality of priority levels with different thresholds for the fault priority indexes. Based on the priority level, the method may comprise determining if one or more actions should be performed, and what those actions are.

Figures 4, 5:
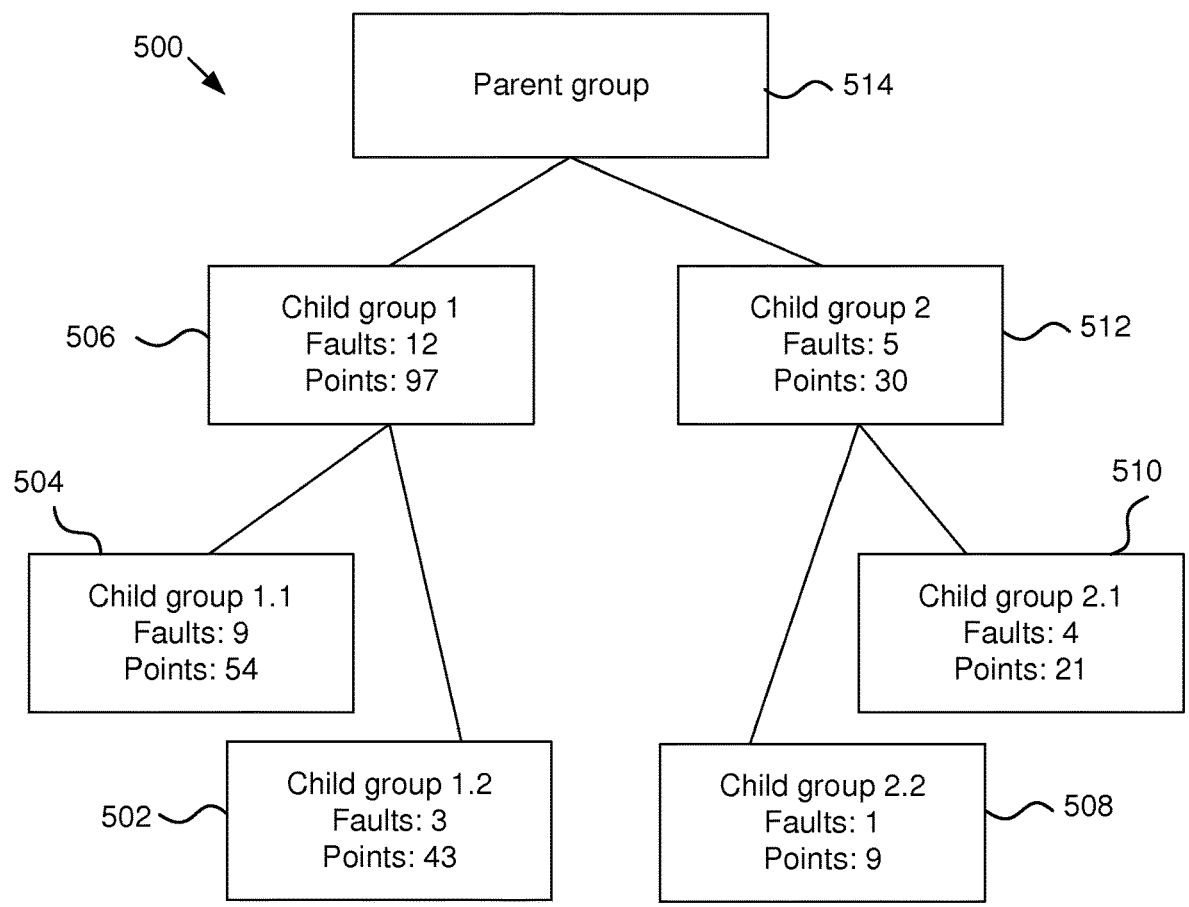
FIG. 4 illustrates an example configuration of actions to be taken based on thresholds for fault priority indexes according to an example embodiment.
FIG. 5 illustrates an example of a hierarchical model of a network of electric vehicle charging stations to create maintenance alerts according to an example embodiment.

FIG. 4 illustrates an example configuration 400 of actions to be taken based on thresholds for fault priority indexes according to an example embodiment. The priority levels as well as the respective actions may be configurable by the user. Hence, different needs and practice, such as different service levels, of different entities may be considered. In an embodiment, the method may comprise determining a group to which the charging station belongs to and determine the action to be performed based on the configuration of the thresholds and respective actions for that group, at 304.

For example, a fault priority index with a value of 0-4 points (out of 100) may be on a lowest priority level, which may require no actions. A second priority level may be determined for fault priority indexes of 5-25 points. At the second priority level, the method may comprise performing a first automatic action, which may be rebooting the charging station. A third priority level may be determined for fault priority indexes of 25-59 points. At the third priority level, the method may comprise performing the first automatic action. If the first automatic action does not fix the fault, the issue may be alerted to a remote maintenance personnel. A fourth priority level may be determined for fault priority indexes of 50-79 points. At the fourth priority level, the automatic actions may comprise the first and a second automatic action. The second automatic action may comprise doing a remote firmware update if a newer firmware version exists. If the first and the second automatic actions do not fix the problem, the issue may be reported to the remote maintenance. A fifth priority level may be determined for fault priority indexes of 80-100 points. At the fifth priority level, the automatic actions may comprise the first, the second, and a third automatic action. The third automatic action may comprise resetting the internet connectivity of the charging station. For example, the method may comprise performing each of the automatic actions in response to an alert. Alternatively, the automatic actions may be performed one by one until the problem is fixed, or until each automatic action is performed without fixing the problem and the alert is forwarded to remote or local maintenance, for example.

At 306, the method may comprise calculating a new fault priority index value after the automatic actions. At 308, the method may comprise determining if the new fault priority index value still requires maintenance actions. For example, if the priority level has not changed, another automatic action configured for that priority level may be performed at 310. If none of the automated actions fixed the fault, the issue may be reported to the remote maintenance. If that does not help either, the issue may be reported to a local maintenance. As shown in the example of FIG. 4, only higher priority level issues may be notified to remote or onsite maintenance if the configured automatic actions are not enough to solve the issue. Hence, only the most urgent problems, which cannot be solved automatically or remotely, may be reported for onsite maintenance.

FIG. 5 illustrates an example of a hierarchical model of a network 500 of electric vehicle charging stations to create maintenance alerts according to an example embodiment.

Each electric vehicle charging station may belong to one or more groups 502, 504, 506, 508, 510, 512, 514. The groups may form a hierarchy where one parent group 514 may have several child groups 502, 504, 506, 508, 510, 512. A higher-level child group 506, 512 may be also a parent group for lower-level child groups 502, 504, 508, 510. Each group level may have a dedicated maintenance contact. The maintenance contact may be responsible for at least one of remote or onsite maintenance tasks. Hence, maintenance may be considered on several levels and alerts may be escalated along the group levels if needed. For example, if one group does not for some reason manage and fix some faults, the problem may be escalated to the parent group. In general, the parent groups may be responsible for their child groups.

In an embodiment, the method may comprise prioritizing the alerts hierarchically. The alerts and urgency of the alerts may be determined for each group. On a parent group level, several parent groups may be calculated together to see picture on several groups. Further, the groups may be grouped together on several levels in order to create a drill-down possibility of where the faults are in. This may further enable an escalation logic on group hierarchy levels and from one level to another.

Each child group 502, 504, 506, 508, 510, 512 may have a certain number of faults. Further, a sum of fault priority index points of the faults may be determined for the group. The parent group's 514 faults and the fault priority index are determined based the sum of the values of all child groups 502, 504, 506, 508, 510, 512. If one lower-level group 502, 504, 506, 508, 510, 512 fails to manage and fix one or more faults, the problem may be escalated to the parent group 514. However, the problem should not be escalated immediately or too easily. An objective is to escalate the problem only when something may be seriously wrong with one or more charging stations.

In an embodiment, the method may comprise determining an escalation index. The escalation index refers to a number that indicates how many serious faults there are in charging stations of one group before an alert about the faults is escalated to a higher-level group. The escalation index may not be just a simple sum or an average value of the faults.

For example, if a group has 10 charging stations and one of them has a serious fault, the average number of faults is high, i.e., 10% of the charging station has a fault. In this case, generating an escalation is not needed because of just one single charging station has a fault.

To make the escalation logic more appropriate, two indicators are combined for the escalation index, the sum of charging station with faults in the respective group and the fault priority index of those faults. Hence, in case of a lot of charging stations with low priority faults, there may be no need for escalation. On the other hand, in case of a lot of charging stations with high-priority faults, the escalation may be triggered.

In an embodiment, the escalation index may be determined based on the number of faulty charging stations with a fault priority index value of equal or higher than 25 points, a sum of the fault priority index points of equal or higher than 25 points and the number of healthy charging stations with a fault priority index value of lower than 25 points. The escalation index may be determined as follows:

Escalation index =

(number of faulty charging stations ∗ sum of the fault priority index points)/(number of healthy stations).

For example, there may be ten charging stations with a total number of fault priority index points of 920 (wherein 1000 points is the maximum) in a first group. In addition, the first group may have 500 healthy charging stations. Therefore, the escalation index would be (10*920)/500=18,4.

For another example, there may be 20 charging stations with a total number of fault priority index points of 500 (wherein the maximum points are 2000), and healthy charging stations in a second group. The escalation index would now be (20*500)/30=333. Hence, the situation of the second group is a lot worse than the situation of the first group based on the escalation index, even though the total number of fault priority index points is higher for the first group.

In an embodiment, the method may comprise determining an escalation index limit for each child group before management of the faults is escalated to a respective parent group. For example, the escalation index limit for group 1 506 may be 150, for group 2 512 100, and for group 1.1 504 130. Hence, the group 1 506 may receive an escalation alert when the escalation index of the lower level (groups 1.1 504 and 1.2 502) is equal or greater than 150. Any escalation index limit may be updated, for example, when the number of charging station in the group changes. When the escalation index limit is exceeded, the method may comprise sending a report to maintenance. For example, each group may have a primary maintenance contact person. The report may be sent, for example, via email or on a web page. The report may comprise an overview of which organisation has problems and where, with a possibility to drill-down to details.

In an embodiment, the report may comprise the overall fault priority index for the group, the number of unhealthy charging stations, the number of healthy charging stations and data on a sum of the one or more of the fault indicators of the group. The maintenance person is able to search for more details, such as a list of the faulted charging stations in the group and their individual fault priority indexes. Further, the report may enable the maintenance person to investigate details on individual charging stations, such as each occurred fault, priority level of the fault, fault indicators, recommended actions, and performed actions. Hence, management of urgent faults may be optimized.

Figure 6:
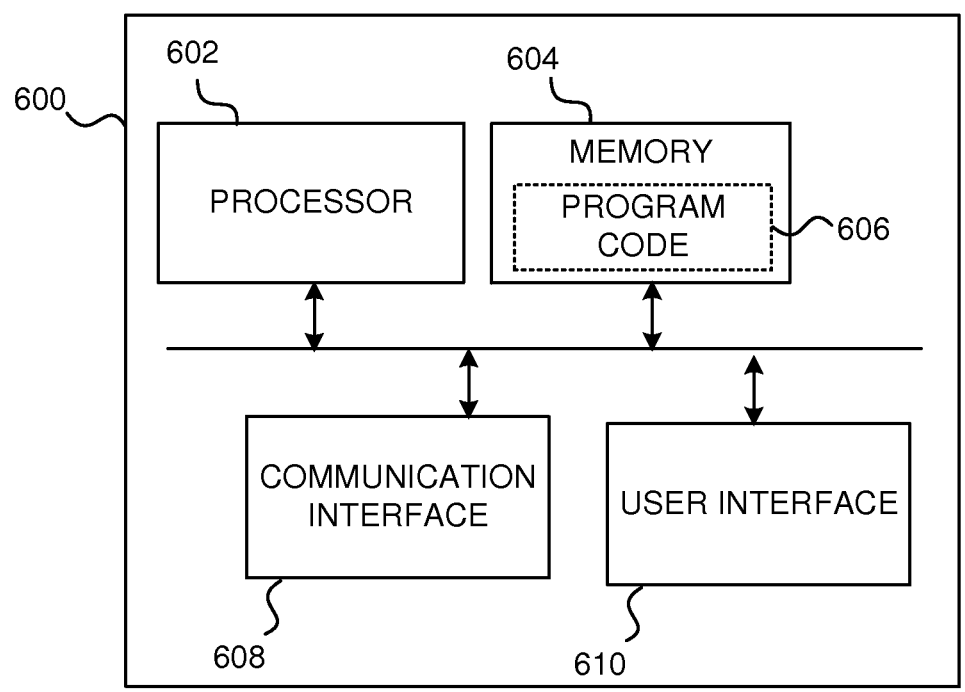
FIG. 6 illustrates an example of an apparatus configured to practice one or more example embodiments. Like references may be used to designate like parts in the accompanying drawings.

FIG. 6 illustrates an example of an apparatus 600 configured to practice one or more example embodiments.

The apparatus 600 may comprise at least one processor 602. The at least one processor 602 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 600 may further comprise at least one memory 604. The memory may be configured to store, for example, computer program code 606 or the like, for example operating system software and application software. The memory 604 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 600 may further comprise communication interface 608 configured to enable apparatus 200 to transmit and/or receive information, to/from other apparatuses, such as the charging stations. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface 208 may comprise, or be configured to be coupled to, at least one antenna to transmit and/or receive radio frequency signals. One or more of the various types of connections may be also implemented as separate communication interfaces, which may be coupled or configured to be coupled to a plurality of antennas. The apparatus 600 may further comprise a user interface 610 comprising an input device and/or an output device.

When the apparatus 600 is configured to implement some functionality, some component and/or components of the apparatus 600, such as for example the at least one processor 602 and/or the memory 604, may be configured to implement this functionality. Furthermore, when the at least one processor 602 is configured to implement some functionality, this functionality may be implemented using program code 606 comprised, for example, in the memory 604.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUS).

The apparatus 600 comprises means for performing at least one method described herein. In one example, the means comprises the at least one processor 602, the at least one memory 604 including program code 606 configured to, when executed by the at least one processor 602, cause the apparatus 600 to perform the method.

The apparatus 600 may comprise for example a computing device such as for example a server device, a client device, a mobile phone, a tablet computer, a laptop, or the like. Although the apparatus 600 is illustrated as a single device it is appreciated that, wherever applicable, functions of the apparatus 600 may be distributed to a plurality of devices. In one example, the apparatus 600 may comprise a CSMS server device.

It is obvious to a person skilled in the art that with the advancement of technology, the basic idea of the invention may be implemented in various ways. The invention and its embodiments are thus not limited to the examples described above, instead they may vary within the scope of the claims.

Further features of the methods directly result from the functionalities and parameters of the apparatus as described in the appended claims and throughout the specification and are therefore not repeated here. It is noted that one or more operations of the method may be performed in different order.

An apparatus may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A method carried out by an apparatus, comprising:
   detecting a trigger for calculation of a fault priority index for at least one electric vehicle charging station;
   determining more than one fault indicator, the fault indicators comprising at least one of a duration of an offline state, a frequency of the offline state, a duration of a fault, a frequency of the faults or a number of rejected commands within a predetermined interval at the electric vehicle charging station;
   calculating the fault priority index by combining values of the fault indicators;
   determining a priority level of the fault priority index based on a plurality of priority levels having different predetermined thresholds for the fault priority index and one or more actions dedicated for the priority level;
   initiating at least one action to manage fault at the at least one charging station based on the priority level of the fault priority index, wherein the at least one action comprises automatically sending one or more commands configured to at least one of reboot or change one or more settings at the electric vehicle charging station;
   updating the fault priority index of the electric vehicle charging station after performing the at least one action; and
   if the updated fault priority index indicates that the fault still exists, initiating another action according to the priority level of the fault priority index.

2. The method of claim 1, wherein the trigger comprises at least one of an indication the electric vehicle charging station is offline, a fault status notification from the electric vehicle charging station, a rejection of a command by the electric vehicle charging station, a failure to answer to a command by the electric vehicle charging station or a return to a normal state by the electric vehicle charging station.

3. The method of claim 1, wherein the frequency of the offline state is determined based on a total duration of the offline states of the electric vehicle charging station within the predetermined interval.

4. The method of claim 1, wherein the frequency of the faults is determined based on a total duration of the faults of the electric vehicle charging station within the predetermined interval.

5. The method of claim 1, wherein the one or more actions comprise at least one of providing a list of the electric vehicle charging stations in an order of urgency based on the fault priority indexes, providing a recommendation how to fix the fault, rebooting the electric vehicle charging station, performing a firmware update to the electric vehicle charging station, resetting internet connectivity of the charging station, alerting a remote maintenance, or alerting an onsite maintenance.

6. The method of claim 1, further comprising:
   grouping a plurality of electric vehicle charging stations into a plurality of child groups;
   grouping the plurality of child groups into one or more parent groups;
   determining an escalation index for each group by multiplying the number of faulty electric vehicle charging stations in the group by the sum of the fault priority indexes in the group, and dividing the value by the number of electric vehicle charging stations without a fault in the group; and
   providing a notification to a contact person of the parent group when the escalation index exceeds a predetermined limit for the child group.

7. An apparatus to manage faults of electric vehicle charging stations, the apparatus comprising at least one processor; and at least one memory comprising program code configured to, with the at least one processor, cause the apparatus at least to:
   detect a trigger for calculation of a fault priority index for at least one electric vehicle charging station;
   determine more than one fault indicator, the fault indicators comprising at least one of a duration of an offline state, a frequency of the offline state, a duration of the fault, a frequency of faults or a number of rejected commands within a predetermined interval at the electric vehicle charging station;
   calculate the fault priority index by combining values of the more than one fault indicator;
   determine a priority level of the fault priority index based on a plurality of priority levels having different predetermined thresholds for the fault priority index and one or more actions dedicated for the priority level;
   initiate at least one action to manage fault at the at least one charging station based on the priority level of the fault priority index, wherein the at least one action comprises automatically sending one or more commands configured to at least one of reboot or change one or more settings at the electric vehicle charging station;
   update the fault priority index of the electric vehicle charging station after performing the at least one action; and
   if the updated fault priority index indicates that the fault still exists, initiate another action according to the priority level of the fault priority index.

8. The apparatus of claim 7, wherein the trigger comprises at least one of an indication the electric vehicle charging station is offline, a fault status notification from the electric vehicle charging station, a rejection of a command by the electric vehicle charging station, a failure to answer to a command by the electric vehicle charging station or a return to a normal state by the electric vehicle charging station.

9. The apparatus of claim 7, wherein the one or more actions comprise at least one of providing a list of the electric vehicle charging stations in an order of urgency based on the fault priority indexes, providing a recommendation how to fix the fault, rebooting the electric vehicle charging station, performing a firmware update to the electric vehicle charging station, resetting internet connectivity of the charging station, alerting a remote maintenance, or alerting an onsite maintenance.

10. The apparatus of claim 7, wherein the at least one memory further comprises program code configured to, with the at least one processor, cause the apparatus to:

group a plurality of electric vehicle charging stations into a plurality of child groups;

group the plurality of child groups into one or more parent groups;

determine an escalation index for each group by multiplying the number of faulty electric vehicle charging stations in the group by the sum of the fault priority indexes in the group, and dividing the value by the number of electric vehicle charging stations without a fault in the group; and provide a notification to a contact person of the parent group when the escalation index exceeds a predetermined limit for the child group.

11. A non-transitory computer-readable medium comprising instructions which, when executed by a computer, cause the computer to carry out the method claim 1.

* * * * *

UNITED STATES PATENT AND TRADEMARK OFFICE
CERTIFICATE OF CORRECTION

PATENT NO. : 12,194,882 B2  
APPLICATION NO. : 18/702501  
DATED : January 14, 2025  
INVENTOR(S) : Jussi Ahtikari Page 1 of 1

It is certified that error appears in the above-identified patent and that said Letters Patent is hereby corrected as shown below:

In the Claims

In Column 17, Line 16, Claim 11, delete "method claim 1." and insert -- method of claim 1. --, therefor.

Signed and Sealed this  
Twenty-ninth Day of April, 2025

Coke Morgan Stewart  
*Acting Director of the United States Patent and Trademark Office*